United States Patent [19]

Janes

[11] 3,935,451
[45] Jan. 27, 1976

[54] METHOD AND APPARATUS FOR SEPARATING LASER IONIZED PARTICLES FROM BACKGROUND IONS

[75] Inventor: George Sargent Janes, Lincoln, Mass.

[73] Assignee: Jersey Nuclear-Avco Isotopes, Inc., Bellevue, Wash.

[22] Filed: Sept. 7, 1973

[21] Appl. No.: 395,021

Related U.S. Application Data

[63] Continuation-in-part of Ser. No. 328,954, Feb. 2, 1973.

[52] U.S. Cl. .............. 250/283; 250/288; 250/290
[51] Int. Cl. ........................................ H01j 39/34
[58] Field of Search .......... 250/251, 283, 288, 290, 250/299, 300, 425

[56] References Cited
UNITED STATES PATENTS

| | | | |
|---|---|---|---|
| 2,938,116 | 5/1960 | Benson et al. | 250/287 |
| 3,258,591 | 6/1966 | Blauth et al. | 250/288 |
| 3,294,970 | 12/1966 | Jenckel | 250/423 |
| 3,443,087 | 5/1969 | Robieux et al. | 250/290 |
| 3,478,204 | 11/1969 | Brubaker et al. | 250/423 |
| 3,772,519 | 11/1973 | Levy | 250/288 |

*Primary Examiner*—James W. Lawrence
*Assistant Examiner*—B. C. Anderson
*Attorney, Agent, or Firm*—Weingarten, Maxham & Schurgin

[57] ABSTRACT

Method and apparatus for separating selectively ionized particles of one isotope type from the background environment of charged and neutral particles. In particular, a particle flow is generated which contains neutral particles of plural isotope types, as well as a number of ions of the various isotope types. It is desired to selectively ionize and separately collect only those particles of one isotope type and for this purpose, an acceleration is produced in the ions of the background environment prior to selective ionization of the desired isotope particles. After selective ionization, a further acceleration, in an opposite direction, is produced upon the charged particles which results in a deflection of the selectively ionized particles towards collection surfaces and restores to generally normal flow velocity and charge distribution, the ions from the background environment.

33 Claims, 6 Drawing Figures

METHOD AND APPARATUS FOR SEPARATING LASER IONIZED PARTICLES FROM BACKGROUND IONS

CROSS REFERENCE TO RELATED APPLICATION

This application is a continuation-in-part of my previously filed U.S. patent application, Ser. No. 328,954, filed Feb. 2, 1973.

FIELD OF THE INVENTION

This invention relates to isotope separation and in particular to a system for separating selectively ionized particles of one isotope type from a background environment of neutral and charged particles.

BACKGROUND OF THE INVENTION

A technique for isotope separation, specifically enrichment of the uranium $U_{235}$ isotope, is shown in copending application Ser. No. 25,605, filed Mar. 25, 1970 and in corresponding French patent 71.14007, Jan. 10, 1971, both incorporated herein by reference. The system therein disclosed operates by generating a vapor of uranium metal which expands as a predetermined particle flow. The $U_{235}$ isotope is selectively ionized by application of a narrow bandwidth, precisely tuned laser radiation to selectively excite and ionize only the $U_{235}$ isotope without substantial ionization of the other isotopes. Once the particles of the desired $U_{235}$ isotope have been ionized, they are accelerated toward collection surfaces and out of the general particle flow by, typically, crossed-field magnetohydrodynamic forces.

The efficiency and effectiveness of the system depends upon gathering at the collection surfaces a maximum of $U_{235}$ particles and a minimum of all other components in the vapor flow. By using a narrow bandwidth, suitably tuned laser radiation for the selective ionization, a very great increase in the proportion of ionized $U_{235}$ particles as contrasted to laser ionized particles of other isotope types can be achieved. Nevertheless, background ions existing in the particle flow prior to laser ionization will typically reflect the normal distribution between $U_{235}$ and other uranium particles and will accordingly be composed primarily of $U_{238}$ particles. These particles will, of course, be accelerated by the same MHD forces which accelerate the selectively ionized particles and will accumulate on the collection surfaces along with the $U_{235}$ particles to reduce the efficiency of the separation process.

Where elemental uranium is employed as a source from which the particle flow is generated, substantial energy must be imparted to the solid uranium to raise it to the vapor state. The presence of this and other energy will operate through phenomena such as particle collisions, or thermal distributions to create a substantial number of ionized particles of uranium in the vapor flow prior to the application of ionizing laser radiation. As a result, the loss in separation efficiency through collection of the background ions can be significant.

BRIEF SUMMARY OF THE INVENTION

In accordance with the present invention, a system is disclosed for distinguishing between background ions and selectively ionized particles for specific isotope separation and collection.

In the preferred embodiment of the present invention for uranium enrichment, a uranium vapor flow is created by vaporizing from the surface of a mass of elemental uranium metal. The radially expanding vapor flow is sequentially pulsed with a magneto-hydrodynamic force to accelerate the background charged particles in a first direction, then selectively ionized by applied laser radiation to excite particles of the desired isotope type into the ion state and finally pulsed with a further magnetohydrodynamic force to decelerate the accelerated background ions and to accelerate the selectively ionized particles of the desised iostope type onto trajectories for impact on collection plates. These plates are typically oriented so as not to intercept the general particle flow but only the deflected particles of the desired isotope type.

As a result of the process and apparatus of the present invention, a substantial improvement is realized in the efficiency of the enrichment system. In addition, the particles which accumulate on the collection plates, being of a higher purity in the desired isotope, tend to accumulate at a slower rate and, therefore, the plates do not require cleaning and replacement as frequently. In addition, the system of the present invention permits the generation of electrical current in regions other than where ionizing radiation is applied without having an average non-zero component that might disturb the charged particle distribution responsible for providing conductivity in the MHD system.

BRIEF DESCRIPTION OF THE DRAWINGS

These and other features of the present invention will be more fully described below in a detailed description of the preferred embodiment, presented for purposes of illustration and not by way of limitation, and in the accompanying drawings of which.

DETAILED DESCRIPTION OF THE PREFERRED EMBODIMENT

The present invention in its preferred embodiment contemplates a method and apparatus for collecting selectively ionized particles apart from a background environment of neutral particles, as well as ions resulting from effects other than selective ionization. While the application of the present invention is contemplated for use with particles of either molecular or atomic nature in any physical state, the preferred embodiment is operative for isotope separation of elemental uranium particles in a vapor flow. In addition, while selective ionization may be achieved through several techniques, the preferred embodiment employs laser radiant energy (one or more frequencies of radiation) which is tuned to excite and ionize particularly the $U_{235}$ isotope.

Figure 1:
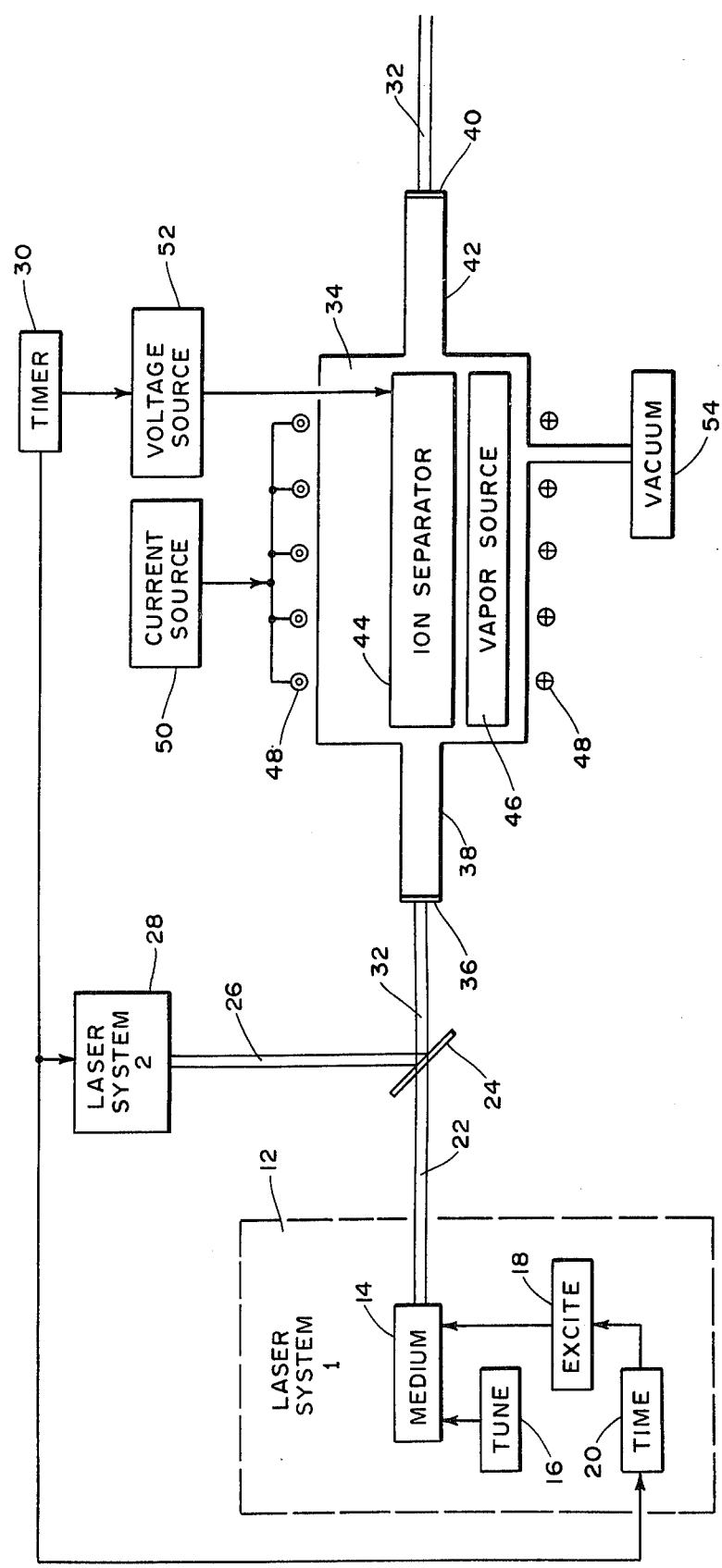
FIG. 1 is a diagrammatic view of an overall separation system for use with the present invention.

A fuller description of the present invention is presented below in the context of a system for separation of the $U_{235}$ isotope of uranium and for that purpose reference is made to FIG. 1 showing an overall diagrammatic view of preferred $U_{235}$ separation apparatus. As shown there, a first laser system 12 comprises a lasing medium 14 which may typically be a dye solution. Tuning apparatus 16 is employed with the medium 14, for example a resonant cavity of mirrors, to select a predetermined narrow bandwidth of laser radiation corresponding to a transition for the $U_{235}$ isotope, typically from the ground energy level, to an intermediate energy level below ionization. The tuning system 16 may additionally include frequency selective elements such as prisms, gratings and/or etalon filters serving to more narrowly define the photon energy in the output of laser system 12. An excitation system 18 is provided to pump the medium 14 to a lasing condition by creating a population inversion. For this purpose, an additional laser or flash lamp may be employed for excitation system 18. A laser pulse initiating system 20 is provided to activate the excitation system 18 or to control the medium 14 as is desired.

The entire laser system 12 may comprise one of the Dial-A-Line lasers of the Avco Everett Research Laboratory, Everett, Massachusetts, having in addition, as desired, an etalon filter or other means for bandwidth definition as well as one or more stages of amplification as found desirable.

The first laser system 12 provides each pulse of laser radiation, having a typical duration of a few nanoseconds to a significant fraction of a microsecond, in a beam 22 which is directed through a dichroic mirror 24 to be combined with the output beam 26 of a second laser system 28. In typical application, the radiation in the beam 26 has a sufficient photon energy to raise selectively excited $U_{235}$ particles to the ionized state. Generally speaking, it is desirable to have a high photon density in the beam 26 because of the relatively lower cross-section of the ionization transition and, therefore, it will be preferable to select photon energies for the beams 22 and 26 such that a relatively high power laser may be employed for the laser system 28. While two distinct radiations are shown in FIG. 1, it is contemplated that more than two may be employed where it is found desirable or, indeed, a single photon energy corresponding to an autoionization transition for the desired isotope may be selected.

Where two radiations are employed, an appropriate frequency for the first or excitation radiation may be selected from available tabulations, while the ionizing second radiation is then to have a photon energy sufficient to ionize the excited particles. Typically, the voltage in the radiation beams 22 and 26 are simultaneously generated by a timer system 30 which applies signals to the initiate systems 20 in each laser system 12 and 28. For continuous isotope separation, the pulses of laser radiation will be provided periodically at a typical repetition rate up to 50 $KH_z$, using, if necessary, plural laser systems.

The radiant laser energy in beams 22 and 26 is combined into a composite beam 32 which is applied to an evacuated, selective ionization and separation chamber 34 through a window 36, typically optical quartz, on a long pipe 38 to remove the location of window 36 from the contaminating atmosphere within the chamber 34. The beam 32 exists from the chamber 34 through a window 40 on a further pipe 42 and may be applied to one or more similar chambers for more complete use of the photon energy in the beam 32.

In passing through the chamber 34, the beam 32 passes through an ion separator 44 where uranium vapor generated by a vapor source 46 is exposed to each pulse of radiation in beam 32 to produce selective ionization typically of the $U_{235}$ isotope. The repetition rate of radiation pulses in beam 32 is typically selected to provide exposure of all portions of the vapor in sequential radiation bursts.

In order to accelerate charged particles within the uranium vapor, either pre-existing ions or selectively ionized particles, a set of magnet field coils 48, coaxial to beam 32, are excited with current from a current source 50 to produce a magnetic field within the region of the ion separator 44 generally in a direction parallel or anti-parallel to the direction of beam 32. The magnetic field produced by the set of coils 48 cooperates with an electric field generated within the ion separator 44 by excitation from a voltage source 52 to produce cross-field magnetohydrodynamic forces on the charged particles. These forces are mathematically described as $\bar{j} \times \bar{B}$ forces resulting from applying a specific potential to a magnetic field environment in order to create the requisite $j$ current for the $\bar{j} \times \bar{B}$ forces.

A vacuum system 54 is provided to maintain a low pressure within the chamber 34 to prevent atmospheric or other components from interfering with the separation process as, for example, by particle collision, combustion or otherwise.

Figure 2:
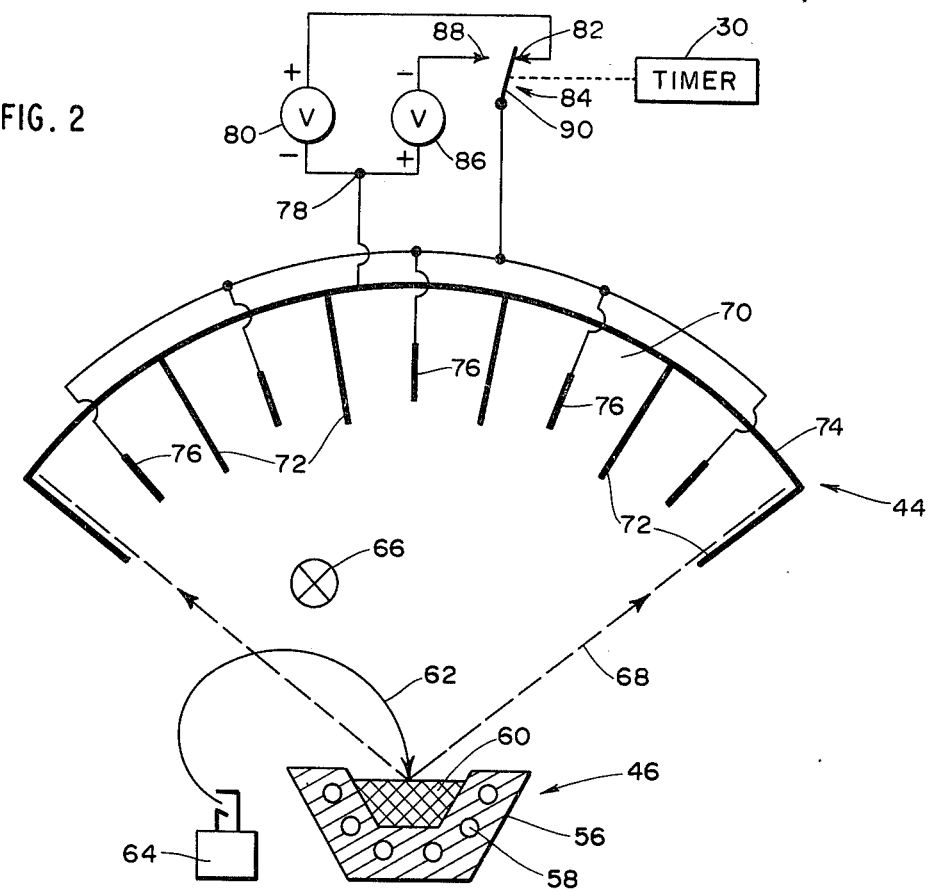
FIG. 2 is an internal sectional diagram of a portion of FIG. 1 apparatus showing further details of the separation system incorporating apparatus of the present invention.

The details of the ion separator 44 and the vapor source 46 within the chamber 34 may be best understood by reference to FIG. 2 which is a diagram of a section of the chamber 34 in FIG. 1. The vapor source 46 is shown there to comprise a crucible 56 having a plurality of cooling ports 58 and containing a mass 60 of uranium metal. An energetic electron beam 62 produced by an electron beam source 64 is focused to a line on the surface of the uranium mass 60 by the magnetic field 66 (typically a few hundred gauss) resulting from current in the coils 48. A radially expanding vapor flow 68 results from heating of the surface of the uranium mass 60 by the electron beam 62. The expanding flow of uranium particles enters the ion separator 44 shown in FIG. 2 to comprise a plurality of chambers 70 which are formed by collection plates 72 that extend the length of the ion separator 44 into and out of the page, and a single, or plural, rear collection plate 74 formed as a cylindrical section. Plates 72 and 74 may be electrically joined as shown in FIG. 2, or separated with separate electrical connections maintained thereto.

Within each chamber 70, there is disposed a central electrode plate 76 which also runs as a thin strip the length of the ion separator 44. The plates 72 and 76 are typically supported at their ends and oriented generally parallel to the radially expanding vapor flow so as to intercept a minimum of flowing particles before accelerating forces are applied to them. The rear plate 74 will typically collect all unaccelerated portions of the vapor flow. All plates 72, 74 and 76 may be composed of, or surfaced with, elemental uranium.

The voltage source 52 is shown in FIG. 2 and includes a common terminal 78 which is connected to the cylindrical plate 74 and, in turn, to the plates 72. One voltage source 80 of typically several hundred volts is connected to terminal 78 to apply a positive voltage to a first contact 82 of a switch 84. A second voltage source 86 of similar or identical voltage magnitude is connected to terminal 78 to provide a negative voltage to a second contract 88 of switch 84. The pointer 90 of switch 84 is controlled by the timer 30 to make electrical connection to either contacts 82 or 88 or neither, and to apply the voltage thereof to each of the central electrode plates 76. It is to be understood that in actual implementation as will be described in FIG. 5, the components of the voltage source 52 will be typically an electronic switching circuit electrically controlled by timer 30, the present form having been described for clarity of illustration.

Figure 3:
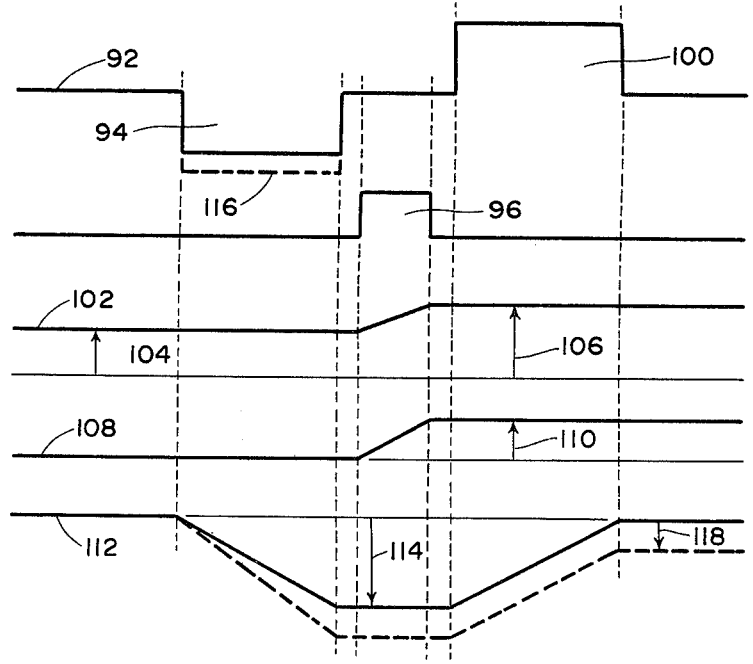
FIG. 3 is a waveform diagram useful in explaining the operation of the apparatus of the present invention.

The sequence of applied electric potentials and laser radiation for the preferred embodiment of the present invention can be visualized by reference to the timing waveforms of FIG. 3 which are generated under the control of the timer 30. Waveform 92 represents one cycle of the repeating pattern of electrical potential applied to the electrode plates 76 with respect to the common terminal 78. Initially, the pointer 90 is connected to the contact 88 to provide a pulse 94 of negative potential to the electrodes 76 during a first interval to produce an acceleration in each chamber 70 before the subsequent application of laser radiation to the vapor particles. Directly subsequent to the termination of the negative potential pulse 94, a pulse 96 of laser radiation is provided in the beam 32 to create selective ionization of the $U_{235}$ isotope in the uranium vapor flow. Again, directly subsequent to the pulse 96, a positive electric potential pulse 100 is applied to the plates 76 by pointer 90 being connected to the contact 82.

The significance of this sequence can be best understood by reference to the remaining waveforms of FIG. 3. In particular, waveform 102 represents the ion density in the vapor flow and is shown to have a magnitude 104 prior to the pulse 96 of laser radiation which is increased to a magnitude 106 during the pulse 96 at a substantially linear rate. It can be seen from waveform 102 that the total ion density 106 after selective ionization will include a substantial number of pre-existing ions in the density 104, which because of the overwhelming abundance of the $U_{238}$ isotope will be predominantly $U_{238}$. The result is a substantial reduction in the purity of $U_{235}$ ions in the vapor.

This contamination of the selectively ionized $U_{235}$ by backgrouond $U_{238}$ ions is eliminated or substantially reduced by the sequence of voltage and radiation pulses 94 and 96 and 100 indicated above. As shown in FIG. 3 in waveform 108, the ions resulting from selective ionization will, as a result of the foregoing sequence, achieve an average velocity 110 after the application of pulse 100. As shown in waveform 112, however, the preexisting background ions at the same time point have an average velocity of zero which results from their first having been accelerated in one direction to a velocity magnitude 114 by the voltage pulse 94, and then accelerated in an opposite direction by voltage pulse 100. Only the selectively ionized $U_{235}$ particles will have a distinct velocity different from the other particles of the vapor flow 68. As can be seen from the FIG. 3 representations, it is important to maintain the time integral of the voltage level in the pulses 94 and 100 substantially equal in order to return the pre-existing ions to a zero velocity. Usually equal magnitudes and durations will be used for this purpose. If the magnitude of one of the voltage sources 80 or 86 is different, as represented by the dotted portion 116, then the effect of the sequential voltage pulses 94 and 100 will not be to return the pre-existing ions to a zero average velocity condition, but to leave a residual velocity 118 which may reduce the efficiency of separation achieved with the system of the present invention.

While it is possible to leave a finite residual velocity such as velocity 118, the advantage of a zero residual velocity is the maintenance of normal charge distribution to permit normal plasma conductivity for application of the $\bar{j}$ x $\bar{B}$ accelerating forces.

Additionally, the duration of the entire cycle of FIG. 3 is preferably about one microsecond to minimize effects of charge exchange reactions on the separation efficiency.

Figure 4:
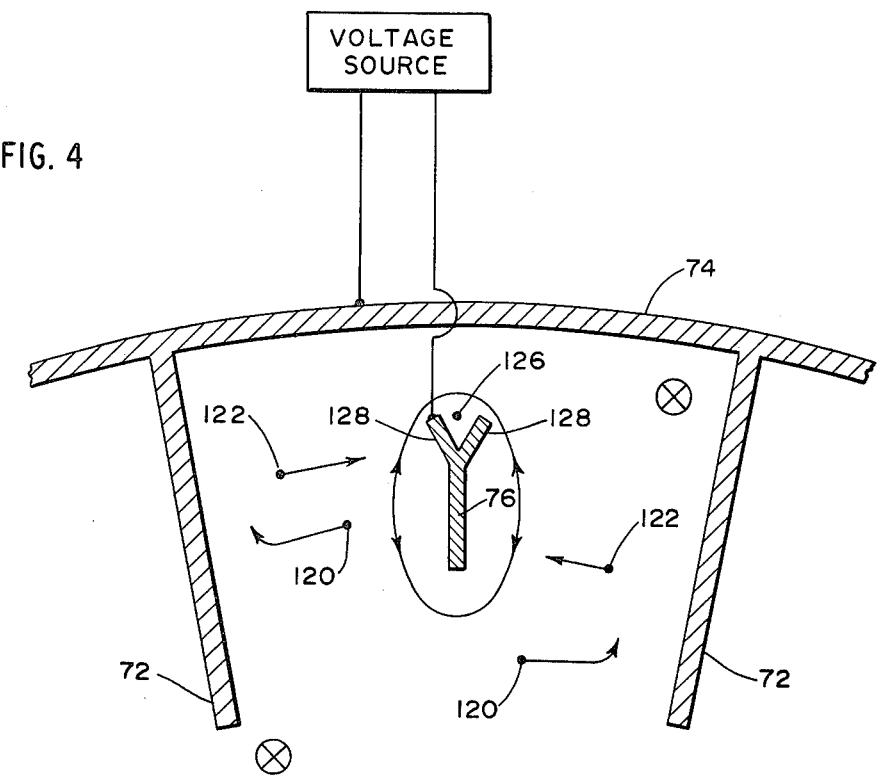
FIG. 4 is an expanded presentation of a portion of the FIG. 2 structure useful in illustrating the operation of the invention and showing a modification.

By reference to FIG. 4, the physical reactions induced in the uranium vapor flow in accordance with the present invention are illustrated in an expanded view of one chamber 70 including a modification in plate 76 structure. Particles 120 are shown to represent the pre-existing background ions in the environment of the uranium vapor flow. These will be affected by the voltage pulse 94 prior to selective laser ionization and will generally be accelerated toward the plates 72 and 74 away from the central electrode 76 by the polarity of that applied voltage pulse. Directly subsequent to the pulse 94, the pulse 96 of laser radiation will generate selectively ionized particles 122 of $U_{235}$. The subsequent application of the voltage pulse 100 will accelerate the $U_{235}$ ions 122 towards the central plate 76 for collection there and will decelerate the particles 120 so they retain only their normal vapor flow velocity as illustrated. During the acceleration of the particles 120 and 122 by the applied electric pulses 94 and 100, the electrons existing in the uranium vapor flow will be caused to drift around the electrodes 76 on a closed orbital path which has a direction depending upon the polarity of the applied voltage. This indiuced electron circulation helps to prevent the generation of unwanted voltages within the system in manner similar to that disclosed in my copending U.S. patent application Ser. No. 328,954, filed Feb. 2, 1973, which is specifically incorporated herein by reference.

Optionally, an electron emitting filament 126, shielded by masking edges 128 of the plates 76, may be used to supply electrons to the plasma region as charge carriers to provide electrode contact and prevent insulating sheaths from developing.

Figure 5:
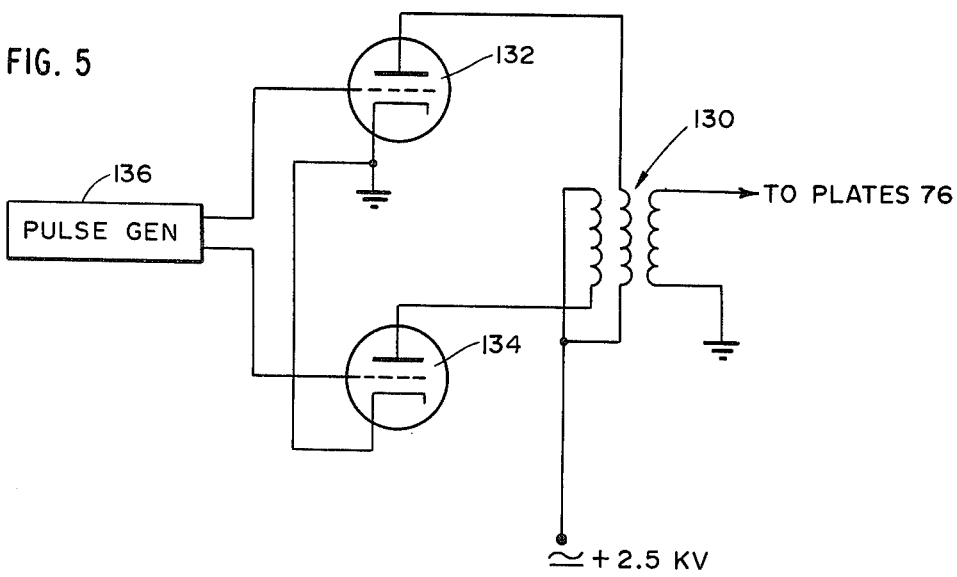
FIG. 5 is a diagram of further details of apparatus for practicing the invention.

Further details of the voltage source 52 are shown in FIG. 5. As represented there, the plates 76 are pulsed in accordance with the waveform diagram 92 by signals from a high voltage pulse transformer 130 having first and second primary windings which are respectively connected to the plates of pulse tubes 132 and 134 on opposite polarity terminals. A 2.5 Kv plate supply voltage is connected to the other primary terminals. The cathode circuits of tubes 132 and 134 are connected in common and the grids are biased and separately pulsed by a pulse generator 136 so as to induce conduction by the tubes 132 and 134 in accordance with the pulses 94 and 100 in FIG. 4. The pulse generator 136 may include a Data Pulse Model 101A signal generator and the vacuum tube circuitry may include a Cobar Pulser.

Figure 6:
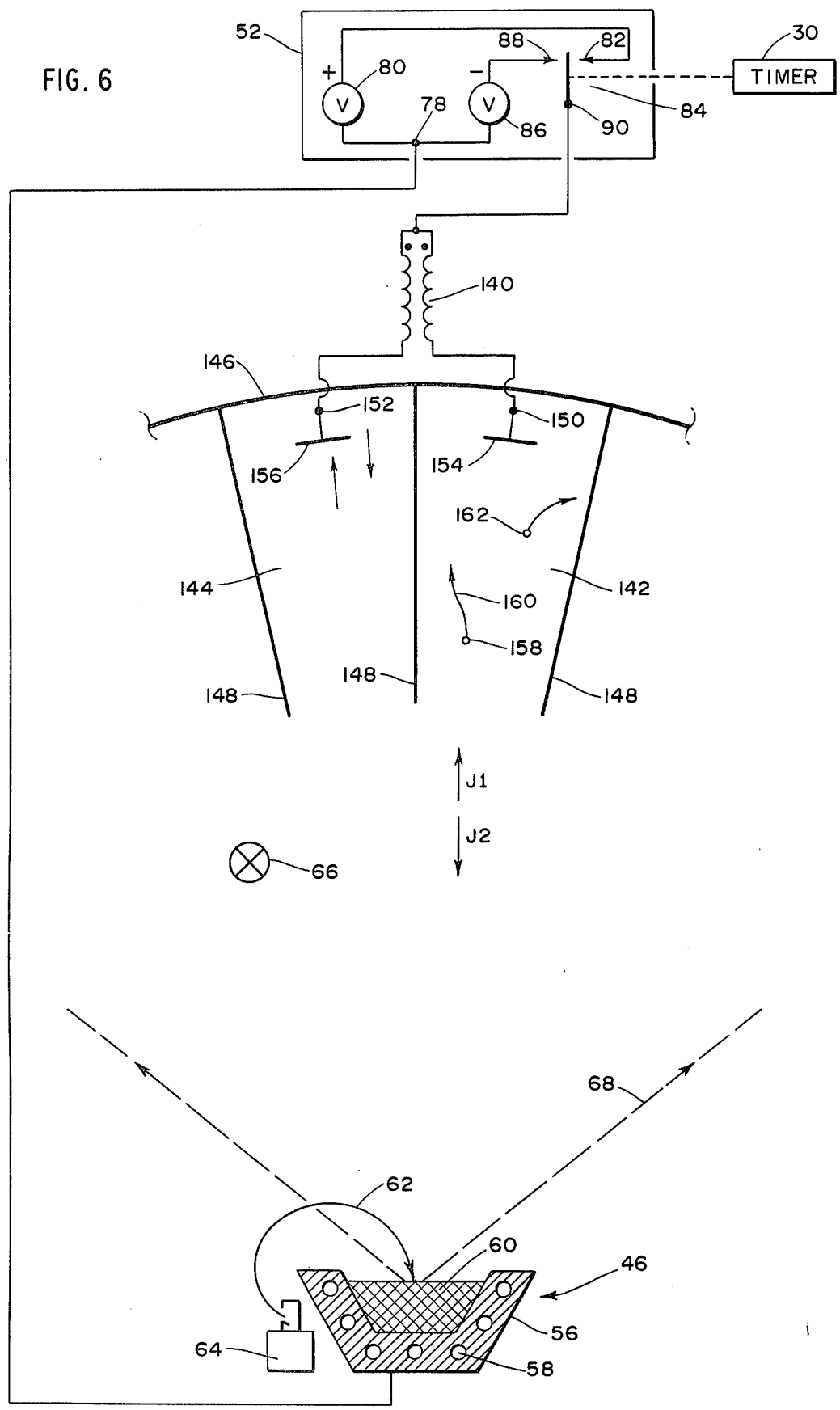
FIG. 6 is an internal sectional diagram of a portion of FIG. 1 apparatus showing modified details of a separation system according to the present invention.

With reference now to FIG. 6, there is shown modified separation apparatus for use in the present invention. In particular, the crucible 56 is connected to the common terminal 78 of the voltage source 52, while pointer 90 of the switch 84 is connected through a current equalizing transformer 140 to provide two equal current outputs to first and second separation chambers 142 and 144, representative of a set of separation chambers which are fanned about the vapor flow 68. Each chamber 142 and 144 is defined by a rear partially cylindrical collection plate 146 and protruding enriched collection plates 148 which extend from the rear plate 146 toward the source of uranium vapor. These plates 146 and 148 are electrically floated while the equalized currents from the transformer 140 are applied to first and second heated, electron emitting filaments 150 and 152 within their respective chambers 142 and 144. The filaments 150 and 152 are located close to the plate 146 and shielded on their opposite sides from uranium in the flow 68 by respective shields 154 and 156. Typically, the shields 154 and 156 will be electrically connected to the filaments 150 and 152. The entire structure of the plates 146 and 148, as well as the filaments 150 and 152 and shields 154 and 156, extend substantially the axial length of the separation chamber in a manner similar to the structure of FIG. 2. As before, photoionizing laser radiation is applied to the chambers 142, 144, etc. to produce selectively ionized particles of uranium $U_{235}$ in the preferred embodiment. In the case of the FIG. 6 system, however, the magnetohydrodynamic forces are created as the result of an applied current in the presence of a magnetic field as opposed to an applied electrical potential in the presence of a magnetic field, as is the case in FIG. 2. The current is drawn between the filaments 150 and 152 (along with the shields 154 and 156) and the uranium vapor source 46. The currents will also be drawn in opposite directions through the chambers 142 and 144 in response to opposite currents applied to the transformer 140 from the voltage source 52 in correspondence with the pulses 94 and 100 in the waveform 92 of FIG. 3. The filaments 150 and 152 provide a source of electrons to sustain this current, particularly when the electron current is emanating from the chambers 142 and 144. The uranium source 46 also acts as a source of electrons, particularly for current in the opposite direction. While it is preferable to use filaments 150 and 152, operation according to the invention may be possible without them.

The currents are represented in FIG. 6 as arrows $\overline{j1}$ and $\overline{j2}$, representing the pulses 94 and 100 respectively. In this case, the pre-existing, background or general ions represented by particle 158, will be accelerated first toward one side of the chambers 142, 144, etc. and then returned to a neutral flow velocity as represented by vector 160. Particles 162 representing selectively photoionized particles will, however, be affected only by the pulse 100 ($\overline{j2}$) and will be deflected toward the right in the diagram toward one of the plates 148 for collection. Where several of the chambers 142, 144 are employed, it will be preferable to employ a set of transformers 140 arranged in a ladder network to provide equalization of currents throughout the entire set of chambers.

The systems of FIG. 2 and FIG. 6 provide the similar result of selective ionization and separate collection of selectively ionized particles without corresponding collection of general background ions. While both using magnetohydrodynamic acceleration techniques, the FIG. 2 MHD acceleration results from the application of crossed electric and magnetic fields, while in FIG. 6 the acceleration results from the application of a current orthogonal to a magnetic field and results in an electric field responsible for attracting ions to the side of the chambers.

Having described above a preferred embodiment of the present invention, it will be apparent to those skilled in the art that alternatives and modifications can be employed within the spirit of the invention. Accordingly, it is intended to limit the scope of the invention only as indicated in the following claims.

What is claimed is:

1. A method for separating ions produced at different times in a region defining an environment of particles of plural isotope types, comprising the steps of:
   applying a first accelerating force in a first direction to the generally ionized particles of said environment;
   selectively ionizing additional particles of a predetermined isotope type in said enviroment after the application of said first accelerating force, including the step of photoexciting the additional particles;
   applying a second accelerating force of different direction to the charged particles of said environment after said ionizing step; and collecting the secondly accelerated ionized particles.

2. The method of claim 1 further including applying said second accelerating force in a direction generally opposite to said first accelerating force.

3. The method of claim 2 wherein said ionizing step includes the step of applying radiant energy to the photoexcited particles of said one isotope type.

4. The method of claim 2 wherein said steps of applying first and second accelerating forces include the steps of applying crossed-field magnetohydrodynamic forces to the charged particles of said environment.

5. The method of claim 4 including in said step of applying said crossed-field forces the step of applying crossed electric potential lines and magnetic field lines in order to achieve a $j$ x B relationship.

6. The method of claim 2 wherein said steps of applying first and second accelerating forces include the steps of applying magnetohydrodynamic forces to the charged particles of said environment by drawing a current through said environment in the presence of a magnetic field.

7. The method of claim 6 including in said step of applying said magnetohydrodynamic acceleration the step of producing an electric field from the $\overline{j}$ x $\overline{B}$ relationship to accelerate charged particles in said environment.

8. The method of claim 2 wherein said steps of applying said first and second accelerating forces further include the steps of applying pulses of an electric field in opposite polarities in a region of a magnetic field, the applied electric fields being substantially orthogonal to the applied magnetic field.

9. The method of claim 8 wherein said electric and magnetic fields are operative to produce said crossed-field forces as $\overline{j} \times \overline{B}$ forces.

10. The method of claim 9 wherein said ionizing step further includes the steps of applying ionizing radiant energy to said environment intermediate the application of said first and second accelerating forces.

11. The method of claim 8 wherein said ionizing step further includes the step of applying ionizing radiant energy to said environment intermediate the application of said first and second accelerating forces.

12. The method of claim 2 wherein said steps of applying said first accelerating forces further include the steps of applying pulses of electric current in opposite directions in a region of a magnetic field, the applied electric current being substantially orthogonal to the applied magnetic field.

13. The method of claim 12 wherein said applied current and magnetic field results in an electric field separation force on photoionized particles of said environment.

14. The method of claim 13 wherein said ionizing step further includes the step of applying ionizing radiant energy to said environment intermediate the application of said first and second accelerating forces.

15. The method of claim 12 wherein said ionizing step further includes the step of applying ionizing radiant energy to said environment intermediate the application of said first and second accelerating forces.

16. The method of claim 2 wherein the interval defined by the period of application of said first and second accelerating forces is short with respect to the charge exchange reaction time of said environment.

17. The method of claim 16 wherein said interval is in the order of magnitude of a microsecond.

18. The method of claim 2 wherein the magnitude of the first and second applied accelerating forces are equal.

19. The method of claim 2 wherein the durations of the first and second applied accelerating forces are equal.

20. The method of claim 2 wherein the time integrals of the magnitudes of the first and second applied accelerating forces are equal.

21. The method of claim 1 wherein said ionizing step includes the step of applying at least first and second laser radiations to said environment, said first laser radiation having an isotopically selective photon energy.

22. The method of claim 21 wherein said particles include particles of uranium.

23. The method of claim 1 further including the step of generating a vapor flow of said particles to define said environment.

24. The method of claim 1 further including the step of sequencing said applying and ionizing steps in an interval short with respect to the charge exchange time for ionized particles in said environment.

25. A method for separating ions produced at different times in a region defining an environment of particles comprising the steps of:
generating said environment as a vapor flow of particles of plural isotope types by application of thermal energy to the particles;
the flowing particles of said plural isotope types having a plurality of ions of generally plural isotope types in said environment;
directing said vapor flow into a region for selective photoionization;
applying a first accelerating force in a first direction to the ionized particles of said environment to induce a motion thereon distinct from said vapor flow;
photoionizing particles of a predetermined isotope type in said vapor flow subsequent to the application of said first accelerating force; and
applying a second accelerating force in a second direction to the general ions of said environment and selectively ionized particles;
said first and second directions of acceleration being substantially opposite; and
collecting the accelerated selectively ionized particles apart from the accelerated generally ionized particles.

26. The method of claim 25 including the step of sequencing said acceleration applying and photoionizing steps in an interval which is short with respect to the period for charge exchange of ionized particles in said environment.

27. Apparatus for separating ions produced at different times in a region defining an environment of particles of plural isotope types comprising:
means for applying accelerating forces to the generally ionized particles of said environment;
means for selectively photoionizing particles of a predetermined isotope type in said environment;
means for activating said accelerating means prior to photoionization to apply a first accelerating force in a first direction to the generally ionized particles of said environment and a second accelerating force subsequent to said photoionization in a second direction; and means for collecting the secondly accelerated ionized particles.

28. The apparatus of claim 27 wherein said activating means includes means for producing said first and second accelerating forces in substantially opposite directions.

29. The apparatus of claim 7 wherein said activating means further includes means for applying said first and second accelerating forces and the intermediate isotopically selective photoionization in an interval which is short with respect to the charge exchange time for ionized particles in said environment.

30. The apparatus of claim 27 further including as said means for applying accelerating forces means for applying crossed-field magnetohydrodynamic forces as the result of orthogonal electric and magnetic fields to produce a $\mathbf{j} \times \mathbf{B}$ acceleration on said ionized particles of said environment.

31. The apparatus of claim 27 wherein the time integrals of the magnitude of the first and second accelerating forces are equal.

32. A system for separating ions produced at different times in a region defining an environment of particles comprising:
means for generating said environment as a vapor flow of particles of plural isotope types by application of thermal energy to the particles;
the flowing particles of said plural isotope types having a plurality of ions of generally plural isotope types in said environment;
said generating means directing said vapor flow into a region for selective photoionization;
means for applying a first accelerating force in a first direction to the ionized particles of said environment to induce a motion thereon distinct from said vapor flow;
means for photoionizing particles of a predetermined isotope type in said vapor flow subsequent to the application of said first accelerating force; and
means for applying a second accelerating force in a second direction to the general ions of said environment and selectively ionized particles;
said first and second directions of acceleration being substantially opposite; and
means for collecting the accelerated selectively ionized particles apart from the accelerated generally ionized particles.

33. The apparatus of claim 27 further including as said means for applying accelerating forces means for drawing a current in the presence of an orthogonal magnetic field through said environment.

* * * * *

UNITED STATES PATENT OFFICE
CERTIFICATE OF CORRECTION

PATENT NO. : 3,935,451
DATED : September 7, 1973
INVENTOR(S) : George Sargent Janes It is certified that error appears in the above–identified patent and that said Letters Patent are hereby corrected as shown below:

Column 2, line 10, change "desised" to read --desired--.

Column 6, line 36, change "indiuced" to read --induced--.

Column 6, line 59, change "Fig. 4" to read --Fig. 3--.

Column 8, line 36, change "j x B" to read --$\bar{j} \times \bar{B}$--.

Signed and Sealed this twenty-seventh Day of April 1976

[SEAL]

Attest:

RUTH C. MASON
Attesting Officer

C. MARSHALL DANN
Commissioner of Patents and Trademarks